United States Patent

Mukohzaka

[11] Patent Number: 5,878,157
[45] Date of Patent: Mar. 2, 1999

[54] INDIVIDUAL IDENTIFICATION APPARATUS

[75] Inventor: Naohisa Mukohzaka, Hamamatsu, Japan

[73] Assignee: Hamamatsu Photonics K.K., Shizuoka-ken, Japan

[21] Appl. No.: 709,035

[22] Filed: Sep. 6, 1996

[30] Foreign Application Priority Data

Sep. 8, 1995 [JP] Japan .................................. 7-231364

[51] Int. Cl.$^6$ ...................................................... G06K 9/00
[52] U.S. Cl. ............................................. 382/124; 382/280
[58] Field of Search ..................................... 382/115, 116, 382/124–127, 278–280; 356/71; 340/825.34

[56] References Cited

U.S. PATENT DOCUMENTS

| | | | |
|---|---|---|---|
| 4,513,441 | 4/1985 | Henshaw ................................. | 382/280 |
| 4,558,462 | 12/1985 | Horiba et al. ............................ | 382/280 |
| 4,703,349 | 10/1987 | Bernstein ................................. | 382/280 |
| 4,895,431 | 1/1990 | Tsujiuchi et al. ........................ | 382/154 |
| 5,224,174 | 6/1993 | Schneider et al. ....................... | 382/280 |
| 5,537,669 | 7/1996 | Evans et al. ............................. | 382/278 |

FOREIGN PATENT DOCUMENTS

| | | | |
|---|---|---|---|
| 43 24 296 | 2/1994 | Germany ........................ | G06K 9/20 |
| 5159056 | 6/1993 | Japan .............................. | G06F 15/70 |
| 6110918 | 4/1994 | Japan .............................. | G06F 15/336 |
| 2 270 586 | 3/1994 | United Kingdom ............ | A61B 5/117 |

OTHER PUBLICATIONS

IEEE Transactions of Pattern Analysis and Machine Intelligence, vol. 16, No. 12, Dec. 1, 1994, pp. 1156–1168, XP000486818, Qin–Sheng Chen et al.: "Symmetric Phase–Only Matched Filtering of Fourier–Mellin Transforms For Image Registration and Recognition".

"Evaluation of the Fingerprint Verification Methods Based on Two–Dimensional Fourier Transform", Noriyuki Matsumoto et al.; The Institute of Electronics Information and Communication Engineers, Technical Report of IEICE. Pru93–39 (1993–07) pp. 37–44.

"The Fingerprint Verification Methods Based on the FFT and LPC Analysis"; Matsumoto et al.; IEICE Technical Report, vol. 92, No. 27, 1992, pp. 25–31.

Comparison of the Nonlinear Joint Transform Correlator And The Nonlinearly Transformed Matched Filter Based Correlator For Noisy Input Scenes; Bahram Javidi; Optical Engineering; Sep. 1990, vol. 29, No. 9, pp. 1013–1020.

*Primary Examiner*—Christopher S. Kelley
*Attorney, Agent, or Firm*—Sughrue, Mion, Zinn, Macpeak & Seas, PLLC

[57] ABSTRACT

The individual identification apparatus includes the image pick up portion 50 and the calculation processing portion 60. When recording information on a specific individual, the portion 50 picks up a pattern of a predetermined body portion of the specific individual and outputs a reference image signal. When desiring to identify an arbitrary person with the specific individual, the portion 50 picks up a pattern of a predetermined body portion of the arbitrary individual and outputs a target image signal. The portion 60 calculates a correlation signal between the reference image signal and the target image signal. That is, the portion 60 digitizes the reference image signal and the target image signal, electronically Fourier transforms those image signals, electronically multiplies the Fourier transformed images, and electronically inverse Fourier transforms the multiplied result to obtain the correlation signal. The portion 60 then judges, based on the correlation signal, whether the arbitrary person is the specific person.

12 Claims, 3 Drawing Sheets

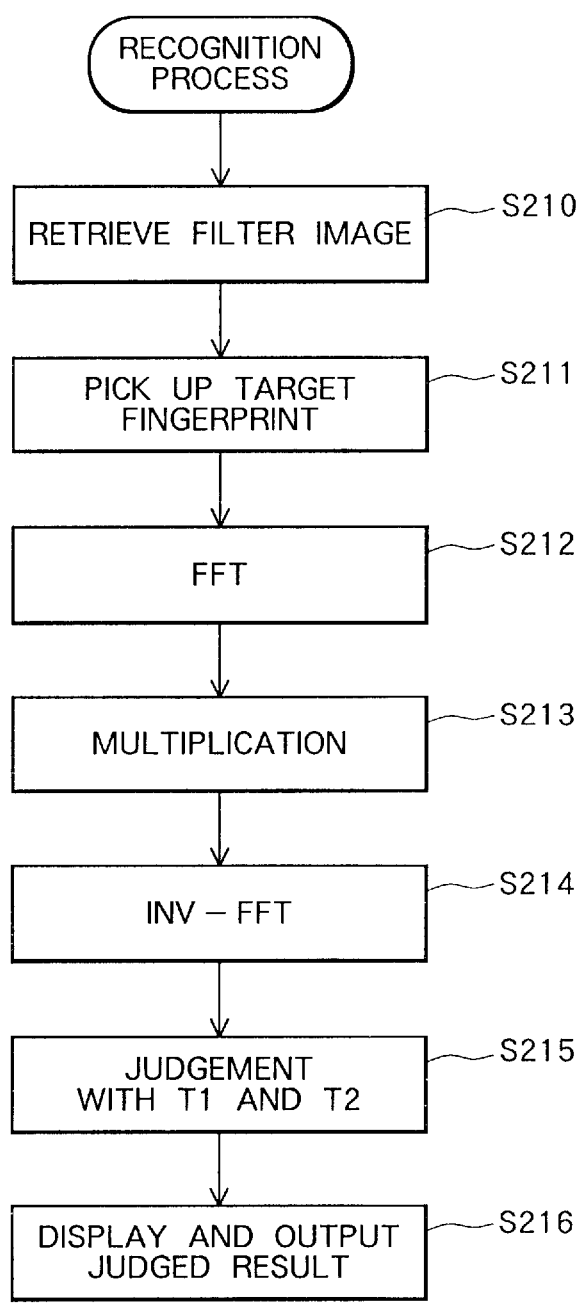

INDIVIDUAL IDENTIFICATION APPARATUS

BACKGROUND OF THE INVENTION

1. Field of the Invention

The present invention relates to an individual identification apparatus for confirming identities of individuals with using a pattern recognition technique.

2. Description of the Related Art

Recently, confirmation of identities of individuals is required in order to manage entrance and exit of individuals in and out of restricted areas and to prevent free access to important equipment. Individual identification apparatuses have been proposed to identify each individual under investigation with a specific individual on record. The person under investigation will be referred to as an "arbitrary individual" hereinafter.

Fingerprints, palm prints, retinas, and voices, for example, are unique for each individual. The individual identification apparatuses therefore generally compare such a unique characteristic of an arbitrary person with a corresponding characteristic of the specific person.

It is noted that the fingerprint has attracted attention because it is easily handled and it can allow the individual identification apparatus to provide a high recognition accuracy. According to a conventional fingerprint identification method, the individual identification apparatus extracts features (minutiae) from fingerprints. The features include character points such as ending and turning points of ridges in the fingerprints. Confirmation of the individual's identity is performed based on those features extracted from the fingerprints.

According to this method, however, fingerprints have to be subjected to complicated preprocessings in order to accurately extract features from the fingerprints. A large number of features have to be extracted from the fingerprints in order to enhance recognition accuracy.

On the other hand, it is still desirable that the number of features be small so that the recognition operation can be attained in a short period of time. These conflicting demands make it difficult to provide an individual identification apparatus which can perform its recognition operation with high accuracy but still within a short period of time.

Especially, confirming a mismatch between different individuals generally requires a longer time period than when confirming a match between identical individuals as described below.

According to the conventional method, when one feature is extracted from the arbitrary person s fingerprint, the extracted feature is compared with a corresponding feature of the specific person's fingerprint. The features in the arbitrary person's fingerprint are subjected one by one to this extracting-and-comparing operation. In order to judge a mismatch between the arbitrary person and the specific person, a predetermined large number of features have to be subjected to the extracting-and-comparing operations. The number of features, in the arbitrary person's fingerprint, that match the corresponding features of the specific person's fingerprint is counted. The mismatch between the arbitrary person and the specific person is confirmed when the number of those matching features is less than a predetermined threshold.

A match between the arbitrary person and the specific person is confirmed when the number of the matching features reaches the predetermined threshold. It is noted, however, that the number of the matching features will possibly reach the predetermined threshold before the extracting-and-matching operations are completed for all the predetermined number of features. In this case, it becomes unnecessary to extract remaining features from the arbitrary person's fingerprint. Thus, confirming a match between identical individuals generally needs extraction of less features than when confirming a mismatch between different individuals. In other words, confirming a mismatch between different individuals generally requires a longer time period than when confirming a match between identical individuals.

SUMMARY OF THE INVENTION

It is therefore, an object of the present invention to overcome the above-described drawbacks, and to provide an individual identification apparatus which can confirm identity of individuals within a short period of time, which is highly stable and reliable irrespective of changes in its environment, and which is still easy to manufacture.

In order to attain the above object and other objects, the present invention provides an individual identification apparatus for identifying an arbitrary individual with a specific individual, the apparatus comprising: image pick up means for picking up a pattern of a predetermined body portion of a specific individual and for outputting a reference image signal for being stored, the image pick up portion also picking up a pattern of the predetermined body portion of an arbitrary individual desired to be identified with the specific individual and for outputting a target image signal; and calculation processing means for obtaining a correlation signal indicative of a correlation between the reference image signal and the target image signal and judging whether or not the arbitrary individual is the specific individual, the calculation processing portion digitizing the reference image signal and the target image signal, electronically performing a Fourier transform on those image signals, electronically multiplying Fourier transformed images, and electronically performing an inverse Fourier transform on the multiplied results to thereby obtain the correlation signal.

According to another aspect, the present invention provides a fingerprint identification apparatus for identifying an arbitrary individual with a specific individual, the apparatus comprising: image pick up means for picking up a fingerprint of an individual; image pick up control means for controlling the image pick up means to pick up a fingerprint of a specific individual and to output a reference image signal indicative of the picked up fingerprint, the image pick up control portion means also controlling the image pick up means to pick up a fingerprint of an arbitrary individual desired to be identified with the specific individual and to output a target image signal indicative of the picked up fingerprint; digitizing means for digitizing image signals; Fourier transforming means for digitally performing a Fourier transform on the digitized image signals; first control means for controlling the digitizing means to digitize the reference image signal and for controlling the Fourier transforming means to Fourier transform the digitized reference image signal to thereby produce a filter image signal; filter storing means for storing the filter image signal; second control means for controlling the digitizing means to digitize the target image signal and for controlling the Fourier transforming means to Fourier transforming the digitized target image signal; multiplying means for digitally multiplying the Fourier transformed results of the target image signal and the filter image signal; inverse Fourier transforming means for digitally performing an inverse Fourier transform on the multiplied results to thereby obtain a correlation signal indicative of a correlation between the reference image signal and the target image signal; and judging means for judging, based on the correlation signal, whether or not the arbitrary individual is the specific individual.

According to a further aspect, the present invention provides an individual identification device for identifying an arbitrary individual with a specific individual, the device comprising: reference image pick up means for picking up a pattern of a predetermined portion of a specific individual to produce a reference image signal indicative of the picked up pattern; reference image digitizing means for digitizing the reference image signal; reference image transform means for Fourier transforming the digitized reference image signal into a filter image signal; storage means for storing the filter image signal; target image pick up means for picking up a pattern of a corresponding portion of an arbitrary individual desired to be identified with the specific individual to produce a target image signal indicative of the picked up pattern; target image digitizing means for digitizing the target image signal; target image transform means for Fourier transforming the digitized target image signal; multiplication means for digitally multiplying the Fourier transformed results of the target image signal and the stored filter image signal; inverse Fourier transform means for digitally performing an inverse Fourier transform on the multiplied results to thereby obtain a correlation signal indicative of a correlation between the reference image signal and the target image signal; and judgement means for judging, based on the correlation signal, whether or not the arbitrary individual is the specific individual.

According to still another aspect, the present invention provides a method for identifying an arbitrary individual with a specific individual, the method comprising the steps of: picking up a pattern of a predetermined portion of a specific individual to produce a reference image signal indicative of the picked up pattern; digitizing the reference image signal; Fourier transforming the digitized reference image signal into a filter image signal; storing the filter image signal; picking up a pattern of a corresponding portion of an arbitrary individual desired to be identified with the specific individual to produce a target image signal indicative of the picked up pattern; digitizing the target image signal; Fourier transforming the digitized target image signal; digitally multiplying the Fourier transformed result of the target image signal and the stored filter image signal; digitally performing an inverse Fourier transform on the multiplied results to thereby obtain a correlation signal indicative of a correlation between the reference image signal and the target image signal; and judging, based on the correlation signal, whether or not the arbitrary individual is the specific individual.

BRIEF DESCRIPTION OF THE DRAWINGS

The above and other objects, features and advantages of the invention will become more apparent from reading the following description of the preferred embodiment taken in connection with the accompanying drawings in which:

FIG. 3 is a flowchart of a recognition (individual identification) process performed by the apparatus of FIG. 1.

DETAILED DESCRIPTION OF THE PREFERRED EMBODIMENT

Figure 1:
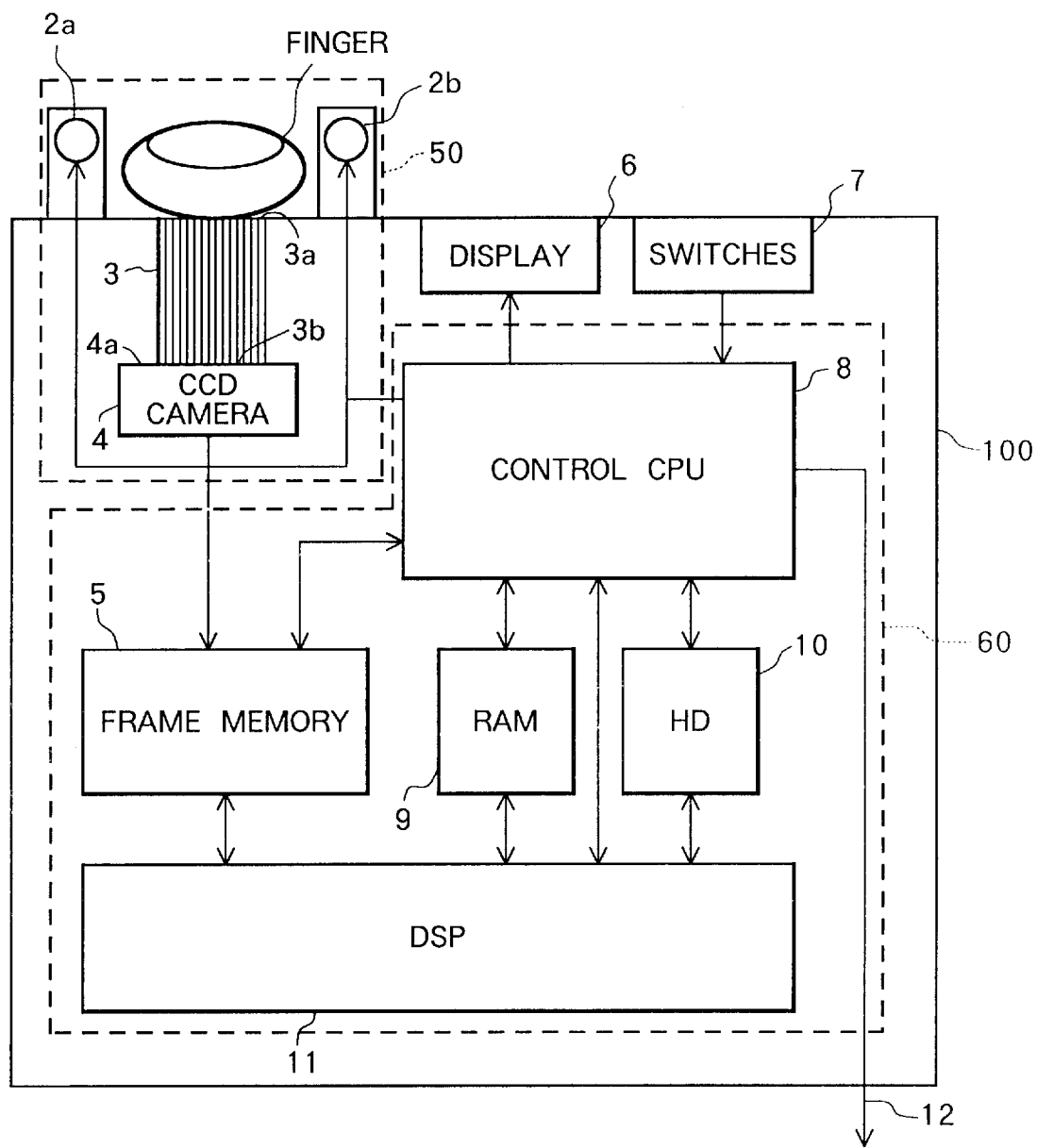
FIG. 1 is a schematic view of a preferred embodiment of an individual identification apparatus of the present invention.

An individual identification apparatus according to a preferred embodiment of the present invention will be described while referring to the accompanying drawings wherein like parts and components are designated by the same reference numerals.

FIG. 1 shows a structure of the individual identification apparatus 100 of the present embodiment. The apparatus 100 of the present embodiment is for identifying an individual under investigation (arbitrary individual) with a specific individual through calculating a correlation between their fingerprints. A fingerprint of the specific individual is previously recorded in the apparatus. In order to confirm whether or not the arbitrary person is the specific person, the apparatus picks up a fingerprint of the arbitrary person. Then, the apparatus electronically calculates a correlation between the specific individual's fingerprint and the arbitrary individual's fingerprint, based on which the apparatus judges whether or not the arbitrary person is the specific person.

As shown in FIG. 1, the individual identification apparatus 100 includes: an image pick up portion 50; a calculation processing portion 60; a display portion 6; and switches 7. The image pick up portion 50 includes a pair of light emission diodes (LEDs) 2a and 2b, a fiber optical plate (FOP) 3, and a charge-coupled device (CCD) camera 4.

The calculation processing portion 60 includes a frame memory 5, a digital signal processor (DSP) 11, a control CPU a, a random access memory (RAM) 9, and a hard disk (HD) 10. The display portion 6 is for showing recognition results. The switches 7 include several switches with which an operator controls the apparatus 100. The switches include mode setting keys for setting a filter storage mode, a recognition mode, and a pattern pick up mode. The switches further include a numerical pad for designating an identification number of a specific individual.

Next, the structure of the image pick up portion 50 will be described in greater detail.

The pair of LEDs 2a and 2b are light emitting elements. The LEDs 2a and 2b are for irradiating with light a finger of an individual when desiring to pick up a fingerprint of the individual. The FOP 3 is an integrated bundle of a plurality of optical fibers. The FOP 3 has opposite end surfaces, that is, an input end surface 3a and an output end surface 3b along the longitudinal directions of the optical fibers. The finger of the individual is placed on the input end surface 3a. The output end surface 3b is made in contact with a light receiving surface 4a of the CCD camera 4. The FOP 3 transmits the fingerprint from the input end surface 3a to the output end surface 3b. The CCD camera 4 is a two-dimensional image pick up element for picking up the fingerprint outputted from the output end surface 3b.

The structure of the calculation processing portion 60 will be described below.

The frame memory 5 is connected to the CCD camera 4. The frame memory 5 serves as an image storage device for receiving image signals outputted from the CCD camera 4, for digitizing the image signals, and for storing the digitized image signals. The DSP 11 is for performing various digital calculations, such as a fast Fourier transform (FFT), on the digital image signals stored in the frame memory 5 to thereby obtain a correlation signal indicative of a correlation between the specific individual's fingerprint and the arbitrary person's fingerprint. The control CPU 8 is for determining, based on the correlation signal, whether or not the arbitrary individual is the specific individual. The control CPU a is also for receiving instruction signals inputted from the switches 7 and for driving the LEDs 2a and 2b and controlling the display 6 to show the determined results.

Each of the RAM 9 and the HD 10 is for storing a filter image (matched filter) representative of the specific individual's fingerprint and an identification number indicative of the specific individual. The HD 10 serves as a backup memory for permanently storing the filter image and the identification number of the specific individual. The RAM 9 is for maintaining the filter image and the identification number only when they are frequently used for a recognition process which will be described later.

Figure 2:
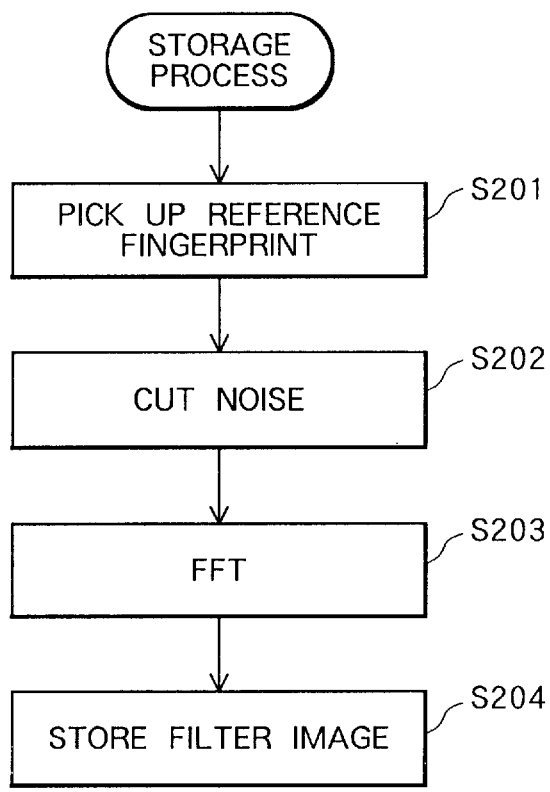
FIG. 2 is a flowchart of a filter storage process performed by the apparatus of FIG. 1.

According to the apparatus 100 with the above-described structure, a fingerprint of a specific individual is previously stored in the apparatus 100 through a filter storage process shown in FIG. 2. When desiring to know whether or not an arbitrary individual is the specific individual, the recognition (individual identification) process is conducted as shown in FIG. 3.

The filter storage process will be first described with reference to FIG. 2.

When a specific individual desires to record his/her fingerprint in the apparatus 100, the specific individual first manipulates the mode setting key to select a filter storage mode, whereupon the filter storage mode starts as shown in FIG. 2. Then, the specific individual manipulates the numeric pad in the switches 7 to designate his/her own identification number. The specific individual places his/her finger on the input end surface 3a as shown in FIG. 1. Then, the specific individual again manipulates the mode setting key to select a pattern pick up mode, upon which the control CPU 8 turns on the LEDs 2a and 2b in S201. As a result, a fingerprint is formed on the output end surface 3b of the FOP 3. The fingerprint is picked up by the CCD camera 4. This fingerprint will be referred to as a "reference fingerprint" hereinafter. The reference fingerprint is then digitized by the frame memory 5 and stored in the frame memory 5.

Next, in S202 and S203, the DSP 11 performs a background noise cutting operation and a fast Fourier transform (FFT) operation on the reference fingerprint now stored in the frame memory 5. The transformed result will be stored in S204 as a filter image.

According to the present embodiment, in order to enhance accuracy in recognition, the DSP 11 creates in S203 a phase-only filter based on a phase term of the Fourier transformed result. During the recognition operation, the phase-only filter will be subjected to a correlation calculation and serve as a matched filter.

The background noise cutting operation of S202 will be described below in greater detail.

As described above, a filter image will be produced in S203 only from the phase term of the Fourier transformed image. During the recognition operation, the thus produced filter image and an arbitrary person's fingerprint will be subjected to a correlation calculation. Because the filter image is produced only from the phase term, the intensity of the reference fingerprint will provide no contribution to production of a correlation signal. For this reason, any background image,even a low intensity one, included In the reference fingerprint will possibly provide a high correlation signal due to a high correlation between the background image in the reference fingerprint and another background image included in the arbitrary person's fingerprint. There is a possibility that the background images in those fingerprints will erroneously provide a high correlation signal even though the arbitrary person is not the specific person. In view of this, according to the present embodiment, the DSP 11 performs a background noise cutting operation in S202 before performing the fast Fourier transform. That is, the DSP 11 subtracts the background image from the image data on the frame memory 5.

The fast Fourier transform performed in S203 will be described below.

The DSP 11 performs in S203 a fast Fourier transform on the noise-cut reference fingerprint. When the reference fingerprint is represented by h (x, y), the Fourier transformed image H (fx, fy) will be represented by the following equation:

$$H(fx,fy)=|H(fx,fy)| \cdot \exp(j\Phi_1).$$

The DSP 11 then eliminates a zero-order component and its vicinity component from the Fourier transformed image. This zero order cutting operation can be easily performed because the spatial frequency of the reference fingerprint gathers within a range of several 1p/mm.

The DSP 11 then normalizes the amplitude term represented by $|H (fx, fy)|$ into one (1), and produces a phase-only filter by the phase term represented by $\exp (j\Phi_1)$.

Then, in S204, the filter image is stored in the RAM 9 together with the designated identification number. The filter image and the identification number are also stored in the HD 10. It is noted that the HD 10 will permanently store the data of the filter image and the identification number as backup data. Contrarily, the RAM 9 will maintain the data of the filter image and the identification number only when the data is frequently used in the recognition process which will be described later. For example, when the data is not used for a predetermined time period, the data will be automatically erased from the RAM 9.

As described above, according to the present embodiment, a phase-only filter is produced from the reference fingerprint. Accordingly, recognition accuracy will be enhanced, and it becomes possible to increase the probability of a match between identical persons and the probability of a mismatch between different persons.

Because noise is eliminated from the reference fingerprint in S202, it becomes unnecessary to perform a noise cutting operation on a fingerprint of an arbitrary individual during the recognition process described below.

Next, the recognition (individual identification) process will be described with reference to FIG. 3.

When an arbitrary person desires to be identified with the specific individual on record, the arbitrary person first manipulates the mode setting key to select the recognition mode, whereupon the recognition process of FIG. 3 starts. Then, the arbitrary person manipulates the numeric pad in the switches 7 to designate the identification number of the specific individual. In S210, the control CPU 3 first transfers the designated identification number to the DSP 11, whereupon the DSP 11 retrieves from the RAM 9 or the HD 10 a filter image corresponding to the identification number. Simultaneously, the arbitrary person places his/her finger on the input end surface 3a of the FOP 3. Then, the arbitrary person manipulates the mode setting key to select the pattern pick up mode, whereupon the control CPU 8 turns on the LEDs 2a and 2b in S211. As a result, a fingerprint is formed on the output end surface 3b of the FOP 3. The fingerprint is picked up by the CCD camera 4. The fingerprint of the arbitrary person will be referred to as a "target fingerprint" hereinafter. The target fingerprint is digitized by the frame memory 5 and then stored in the frame memory 5.

Next, in S212, the DSP 11 performs a fast Fourier transform on the target fingerprint in the same manner as in the filter storage process. The DSP 11 eliminates the zero order component and its vicinity component from the Fourier transformed result. The DSP 11 then calculates a conjugate of the Fourier transformed image. Then, the DSP 11 normalizes an amplitude term of the obtained conjugate pattern, thereby obtaining a phase term of the conjugate pattern.

Then, the DSP 11 multiplies in S213 the phase term of the conjugate pattern with the filter image.

When the target fingerprint is represented by g (x, y), the Fourier transformed image G (fx, fy) is represented by the following equations $$G(fx,fy)=|G(fx,fy)|\cdot exp(j\Phi_2).$$

The conjugate G* (fx, fy) of the Fourier transformed image is represented by the following equation:

$$G^*(fx,fy)=|G(fx,fy)|\cdot exp(-j\Phi_2).$$

The phase term of this conjugate image is multiplied in S213 with the filter image retrieved from the memory 5. Accordingly, this multiplication obtains a product represented by exp $(j\Phi_1)\cdot$exp $(-j\Phi_2)$.

Then, in S214, the DSP 11 performs an inverse fast Fourier transform on the multiplied result. The transformed result represents a correlation signal indicative of a correlation between the target fingerprint and the reference fingerprint. The correlation signal is transferred to the control CPU 8.

In S215, the control CPU 8 measures a maximum value of the correlation peak, and judges whether the measured value is equal to or higher than a predetermined first threshold value T1. The control CPU 8 further measures the amount of a half-width of the correlation signal, and judges whether the measured value is equal to or lower than a predetermined second threshold value T2. The control CPU 8 determines that the arbitrary person is the specific person when the maximum value is equal to or higher than the first threshold T1 and the half-width value is equal to or lower than the second threshold T2.

It is noted that the control CPU 8 may measure only the maximum value of the correlation peak. The control CPU 8 may determine the match between the arbitrary person and the specific person when the maximum value is equal to or higher than the first threshold. In this case, however, an error judgement will possibly occur due to a large variety in the picked-up states of the fingerprints. That is, the fingerprints are often picked up by the FOP 3 as being distorted or being partially faint. The correlation peak intensity will largely vary according to the picked-up states of the fingerprints. It is further noted that not only the intensity but also the shape, such as the half-width, of the correlation peak indicates a correlation degree between the target fingerprint and the reference fingerprint. In view of this, according to the present embodiment, the control CPU 8 performs judgements based on both the peak intensity and the half-width of the correlation signal. It becomes possible to enhance the recognition accuracy.

After performing the above-described judgement, the control CPU 8 controls in S216 the display 6 to show the judged results. The control CPU 8 further outputs a recognition signal 12 to an external device. The recognition signal 12 represents whether or not the arbitrary person is the specific individual. The external device performs various processes using the supplied recognition signal 12. The external device is, for example, a door lock system provided to a door provided to a restricted area. The lock is released only when the recognition signal 12 represents that the arbitrary person is the specific person.

The present inventor produced the individual identification apparatus 100 with using the following electronic devices for the respective elements.

A CPU "80486" was used as the control CPU 8. A "TMS320C40" was used as the DSP 11. A frame memory with 256*256*8 bit areas were used as the frame memory 5. Only the even frames were used. An extended protect memory was used as the RAM 9. An SCSI interface 270 MB hard disk was used as the HD 10.

The present inventor then conducted experiments with the apparatus 100 comprised of the above-described devices. In the experiment, the apparatus 100 was controlled to examine identities of six hundred individuals to confirm its operability.

First, the first and second thresholds T1 and T2 were set so that the probability of erroneously judging a match between different persons became 0.1%. In this case, the probability of erroneously judging a mismatch between identical persons became only 0.1%.

Then, the threshold T1 was decreased and the threshold T2 was increased so that the probability of erroneously judging a match between different persons became 0%. Still in this case, the probability of erroneously judging a mismatch between identical persons increased up to only 4.1%.

Only 0.3 seconds were required to perform each recognition operation. Thus, it was confirmed that the individual identification apparatus 100 can perform a highly accurate recognition operation within a short period of time.

As described above, the apparatus 100 of the present embodiment includes the image pick up portion 50 and the calculation processing portion 60. When recording information on a specific individual, the portion 50 picks up a pattern of a fingerprint of the specific individual and outputs a reference image signal. When desiring to identify an arbitrary person with the specific individual, the portion 50 picks up a pattern of a fingerprint of the arbitrary individual and outputs a target image signal. The portion 60 calculates a correlation signal between the reference image signal and the target image signal. That is, the portion 60 digitizes the reference image signal and the target image signal, electronically Fourier transforms those image signals, electronically multiplies the Fourier transformed images, and electronically inverse Fourier transforms the multiplied result to obtain the correlation signal. The portion 60 then judges, based on the correlation signal, whether or not the arbitrary person is the specific person.

Thus, the individual identification apparatus 100 does not need to extract features from fingerprints of individuals. Instead, the apparatus 100 employs a method for calculating correlation between entire fingerprints. No complicated pre-processings are required. Identities of individuals can be confirmed within a short period of time.

The apparatus 100 obtains a correlation signal through performing a fast Fourier transform operation and, an inverse fast Fourier transform operation. Accordingly, the apparatus can perform its recognition operation within a quite short period of time.

The apparatus 100 is advantageous additionally in that the apparatus can perform judgements for both a match between identical persons and a mismatch between different persons at the same speed. The apparatus can therefore perform trial judgements a plurality of times within a short period of time. The apparatus 100 can therefore perform a highly accurate recognition operation within a short period of time.

Additionally, the apparatus 100 digitizes image signals, and electronically or digitally performs calculation operations with the use of several kinds of electronic devices. The stability and reliability of the apparatus is therefore high with regards to environmental changes. The apparatus is also easy to manufacture, compact, and inexpensive, but has a high performance.

It is noted that correlation between entire fingerprints can be optically calculated through an optical correlation method. Also in this case, it becomes unnecessary to extract features from the fingerprints. However, optical elements employed in the optical system are insufficiently stable and reliable with regards to the environmental changes. The optical elements are expensive to produce. It is therefore difficult to manufacture an optical system-employing individual identification apparatus.

While the invention has been described in detail with reference to the specific embodiment thereof, it would be apparent to those skilled in the art that various changes and modifications may be made therein without departing from the spirit of the invention.

In the above-described embodiment, the control CPU 8 is provided separately from the DSP 11. However, the control CPU 8 can be omitted. The DSP 11 may be designed to serve also as the control CPU 8.

In the above-described embodiment, a conjugate of the Fourier transformed image of the target fingerprint is multiplied with the filter image. However, the Fourier transformed image of the target fingerprint can be directly multiplied with the filter image. The multiplied result may be subjected to the inverse fast Fourier transform, and an obtained signal may be used as a correlation signal.

In the embodiment, fingerprints of individuals are used for confirming identities of individuals. However, other various portions of individuals' bodies can be used.

As described above, according to the present invention, the individual identification apparatus is comprised of an image pick up portion and a calculation processing portion. The image pick up portion picks up a pattern of a predetermined body portion of a specific individual and outputs a reference image signal. The reference image signal is stored in the apparatus. The image pick up portion also picks up a pattern of a predetermined body portion of an arbitrary individual who is desired to be identified with the specific individual, and outputs a target image signal. The calculation processing portion obtains a correlation signal indicative of a correlation between the reference image signal and the target image signal in the following manner. The calculation processing portion first digitizes the reference image signal and the target image signal, electronically performs a Fourier transform on those image signals, electronically multiplies the Fourier transformed images, and electronically performs an inverse Fourier transform on the multiplied results to thereby obtain the correlation signal. The calculation processing portion then judges, based on the correlation signal, whether or not the arbitrary individual is the specific individual.

During the multiplication operation, the Fourier transformed image of the reference image signal may be multiplied with the Fourier transformed image of the target image signal. Or otherwise, the Fourier transformed image of the reference image signal may be multiplied with a conjugate of the Fourier transformed image of the target image signal.

Thus, according to the individual identification apparatus of the present invention, features are not extracted from the body portion patterns, but a correlation calculation is performed onto the body portion patterns. A correlation or a match between the entire body portion patterns is determined through the correlation calculation. Based on the determined correlation degree, the arbitrary person is identified or not identified with the specific individual. Accordingly, contrary to the conventional feature extracting system, it is possible to detect both match and mismatch between the specific person and the arbitrary person within the same short period of time. Accordingly, trial measurements can be performed plural times within a short period of time. Confirmation of individuals' identities can therefore be performed highly accurately within a short period of time.

According to the present invention, the Fourier transform operation, the multiplication operation, and the inverse Fourier transform operation are all performed electronically onto the digitized reference image signal and the digitized target image signal. Accordingly, those operations do not suffer due to environmental changes such as temperature change. The apparatus can therefore maintain its high accuracy recognition operation regardless of its environmental changes. The apparatus can perform its calculation operation with using easily-manufactured electronic devices. The overall apparatus can therefore be easily manufactured.

What is claimed is:

1. An individual identification apparatus for identifying an arbitrary individual with a specific individual, the apparatus comprising:

image pick up means for picking up a pattern of a predetermined body portion of a specific individual and for outputting a reference image signal to be stored, the image pick up means, also picking up a pattern of the predetermined body portion of an arbitrary individual desired to be identified with the specific individual and for outputting a target image signal; and calculation processing means for obtaining a correlation signal indicative of a correlation between the reference image signal and the target image signal and judging whether or not the arbitrary individual is the specific individual, the calculation processing means digitizing the reference image signal and the target image signal, electronically performing a Fourier transform on those image signals, electronically multiplying Fourier transformed images, and electronically performing an inverse Fourier transform on the multiplied results to thereby obtain the correlation signal, the calculation processing means further comprising:

digitizing means for digitizing the reference image signal and the target image signal;

Fourier transforming means for digitally performing a Fourier transform on the reference image signal and the target image signal;

multiplying means for digitally multiplying the Fourier transforms with each other;

inverse Fourier transforming means for digitally performing an inverse Fourier transform on the multiplied result to thereby obtain the correlation signal; and judging means for judging, based on the correlation signal, whether or not the arbitrary individual is the specific individual, the judging means further comprising:

peak measuring means for measuring a peak intensity of the correlation signal;

half-width measuring means for measuring an amount of a half-width of the correlation signal; and judgement means for judging whether the measured peak intensity is equal to or higher than a predetermined first threshold value and whether the measured half-width is equal to or lower than a predetermined second threshold value, to thereby determine that the arbitrary individual is the specific individual when the measured peak intensity is equal to or higher than the first threshold value and the measured half-width is equal to or lower than the second threshold value.

2. An individual identification as claimed in claim 1, further comprising display means for displaying the judged results.

3. An individual identification as claimed in claim 2, further comprising output means for outputting a signal indicative of the judged results.

4. An individual identification as claimed in claim 1, wherein the calculation processing portion further comprises:

storing means for storing the Fourier transform of the reference image signal; and retrieving means for retrieving the Fourier transform of the reference image signal from the storing means, the multiplying means digitally multiplying the thus retrieved Fourier transform with the Fourier transform of the target image signal.

5. An individual identification as claimed in claim 1, wherein the Fourier transforming means includes phase-only filter producing means for producing a phase-only filter from a phase term of the Fourier transform of the reference image signal.

6. An individual identification as claimed in claim 5, wherein the Fourier transforming means further includes noise cutting moans for cutting a background noise from the reference image signal, the background noise cut reference image signal being subjected to the Fourier transform operation.

7. An individual identification as claimed in claim 1, wherein the calculation processing means includes:

a frame memory for digitizing the reference image signal and the target image signal;

a digital signal processor for digitally performing a Fourier transform on those image signals, for digitally multiplying Fourier transformed images with each other, and for digitally performing an inverse Fourier transform on the multiplied results to thereby obtain the correlation signal; and a control CPU for judging, based on the correlation signal, whether or not the arbitrary individual is the specific individual.

8. An individual identification as claimed in claim 1, wherein the image pick up portion includes:

a light emitting unit for emitting light to the predetermined portion of each of the arbitrary individual and the specific individual to produce an image of the predetermined portion;

a fiber optical plate for receiving the image at its input end surface and for transmitting the image to its output end surface; and a CCD camera for picking up the image outputted from the output end surface of the fiber optical plate.

9. An individual identification as claimed in claim 1, wherein the predetermined portion is a finger, and the reference image signal indicates a fingerprint of the specific individual, and the target image signal indicates a fingerprint of the arbitrary individual.

10. A fingerprint identification apparatus for identifying an arbitrary individual with a specific individual, the apparatus comprising:

image pick up means for picking up a fingerprint of an individual;

image pick up control means for controlling the image pick up means to pick up a fingerprint of a specific individual and to output a reference image signal indicative of the picked up fingerprint, the image pick up control means also controlling the image pick up means to pick up a fingerprint of an arbitrary individual desired to be identified with the specific individual and to output a target image signal indicative of the picked up fingerprint;

digitizing means for digitizing image signals;

Fourier transforming means for digitally performing a Fourier transform on the digitized image signals;

first control means for controlling the digitizing means to digitize the reference image signal and for controlling the Fourier transforming means to Fourier transform the digitized reference image signal to thereby produce a filter image signals;

filter storing means for storing the filter image signal;

second control means for controlling the digitizing means to digitize the target image signal and for controlling the Fourier transforming means to Fourier transform the digitized target image signal;

multiplying means for digitally multiplying the Fourier transformed results of the target image signal and the filter image signal;

inverse Fourier transforming means for digitally performing an inverse Fourier transform on the multiplied results to thereby obtain a correlation signal indicative of a correlation between the reference image signal and the target image signal; and judging means for judging, based on the correlation signal, whether or not the arbitrary individual is the specific individual, the judging means further comprising:

peak measuring means for measuring a peak intensity of the correlation signal;

half-width measuring means for measuring an amount of a half-width of the correlation signal; and judgement means for judging whether the measured peak intensity is equal to or higher than a predetermined first threshold value and whether the measured half-width is equal to or lower than a predetermined second threshold value, to thereby determine that the arbitrary individual is the specific individual when the measured peak intensity is equal to or higher than the first threshold value and the measured half-width is equal to or lower than the second threshold value.

11. An individual identification device for identifying an arbitrary individual with a specific individual, the device comprising:

reference image pick up means for picking up a pattern of a predetermined portion of a specific individual to produce a reference image signal indicative of the picked up pattern;

reference image digitizing means for digitizing the reference image signal;

reference image transform means for Fourier transforming the digitized reference image signal into a filter image signal;

storage means for storing the filter image signal;

target image pick up means for picking up a pattern of a corresponding portion of an arbitrary individual desired to be identified with the specific individual to produce a target image signal indicative of the picked up pattern;

target image digitizing means for digitizing the target image signal;

target image transform means for Fourier transforming the digitized target image signal;

multiplication means for digitally multiplying the Fourier transformed results of the target image signal and the stored filter image signal;

inverse Fourier transform means for digitally performing an inverse Fourier transform on the multiplied results to thereby obtain a correlation signal indicative of a correlation between the reference image signal and the target image signal; and judgement means for judging, based on the correlation signal, whether or not the arbitrary individual is the specific individual, the judgement means further comprising:

peak measuring means for measuring a peak intensity of the correlation signal;

half-width measuring means for measuring an amount of a half-width of the correlation signal; and judging means for judging whether the measured peak intensity is equal to or higher than a predetermined first threshold value and whether the measured half-width is equal to or lower than a predetermined second threshold value, to thereby determine that the arbitrary individual is the specific individual when the measured peak intensity is equal to or higher than the first threshold value and the measured half-width is equal to or lower than the second threshold value.

12. A method for identifying an arbitrary individual with a specific individual, the method comprising the steps of:

picking up a pattern of a predetermined portion of a specific individual to produce a reference image signal indicative of the picked up pattern;

digitizing the reference image signal;

Fourier transforming the digitized reference image signal into a filter image signal;

storing the filter image signal;

picking up a pattern of a corresponding portion of an arbitrary individual desired to be identified with the specific individual to produce a target image signal indicative of the picked up pattern;

digitizing the target image signal;

Fourier transforming the digitized target image signal;

digitally multiplying the Fourier transformed result of the target image signal and the stored filter image signal;

digitally performing an inverse Fourier transform on the multiplied results to thereby obtain a correlation signal indicative of a correlation between the reference image signal and the target image signal; and judging, based on the correlation signal, whether or not the arbitrary individual is the specific individual, the judging step further comprising the steps of:

measuring a peak intensity of the correlation signal;

measuring an amount of a half-width of the correlation signal; and judging whether the measured peak intensity is equal to or higher than a predetermined first threshold value and whether the measured half-width is equal to or lower than a predetermined second threshold value, to thereby determine that the arbitrary individual is the specific individual when the measured peak intensity is equal to or higher than the first threshold value and the measured half-width is equal to or lower than the second threshold value.

\* \* \* \* \*